L. M. TODD, C. G. TIEFEL & A. C. LA MAY.
CHECKWRITER.
APPLICATION FILED JULY 19, 1915.

1,299,521.

Patented Apr. 8, 1919.
6 SHEETS—SHEET 3.

WITNESSES:
Magnus H. Johanson

Libanus M. Todd
Charles G. Tiefel
Arthur C. La May
INVENTORS
BY Edw. H. Cumpston Jr
THEIR ATTORNEY.

UNITED STATES PATENT OFFICE.

LIBANUS M. TODD, CHARLES G. TIEFEL, AND ARTHUR C. LA MAY, OF ROCHESTER, NEW YORK, ASSIGNORS, BY MESNE ASSIGNMENTS, TO TODD PROTECTOGRAPH COMPANY, OF ROCHESTER, NEW YORK, A CORPORATION OF NEW YORK.

CHECKWRITER.

1,299,521.     Specification of Letters Patent.     Patented Apr. 8, 1919.

Application filed July 19, 1915. Serial No. 40,657.

*To all whom it may concern:*

Be it known that we, LIBANUS M. TODD, CHARLES G. TIEFEL, and ARTHUR C. LA MAY, all of Rochester, in the county of Monroe and State of New York, have invented certain new and useful Improvements in Checkwriters; and we do hereby declare the following to be a full, clear, and exact description of the same, such as will enable any person skilled in the art to which the invention appertains to make and use the same.

Our present invention relates to the class of printing machines, known as check protectors, or check writers, which are adapted for printing upon commercial paper, such as checks, drafts and the like, the exact monetary value intended to be conveyed by the instrument, by an impression which breaks or shreds the paper and impregnates the disrupted fibers with indelible printing ink, thus making it very difficult to alter, or "raise", the value of the instrument.

More particularly, this invention has to do with a machine of the type disclosed in Letters Patent of the United States No. 1,138,330, granted to Libanus M. Todd and Charles G. Tiefel jointly May 4, 1915, for check writers, comprising, essentially, a type carrier and platen having a relative selective movement for bringing the individual type forms and the platen into coöperative position, the carrier and platen having also a relative printing movement for producing a rolling contact between the type forms and platen, the latter being provided with coacting serrated surfaces which simultaneously shred, print and feed the paper.

The object of the present invention is to provide a machine of this type embodying a number of improved features which greatly increase the convenience and efficiency of operation of the machine. These improvements comprise a construction of the casing of the machine which affords ready access to all interior parts; a means for centering and locking the type carrier in its various printing positions; means for automatically preventing unnecessary rep-
etition in the use of a given type form; means for holding and guiding the paper on the printing bed; an adjustable work supporting means adapted to be folded against the casing when not in use, and provided with a device for automatically clamping it in position and also with an extension member; means for controlling the timing of the relative movements of the printing couple; means for adjusting the position of the platen; an operating member detachable for convenience in packing and for preventing unauthorized operation of the machine; and means for showing the proper location of the work when placed upon the printing bed.

Various other objects will appear as the description proceeds, reference being had by numerals and letters to the accompanying drawings forming a part of this specification in which:—

The present embodiment of the invention comprises preferably a two-part casing consisting of a lower or base portion 20 supported on standards 21, and an upper casing portion 22 having a hinged connection with the lower portion for permitting the two parts to be swung open for access to the interior thereof, and will be more fully described hereafter. These parts of the casing are separated through most of their extent by a work receiving slot located above the printing bed 23 on the base portion 20, Fig. 1, upon which the work is supported as it is fed through the machine.

Figure 3:
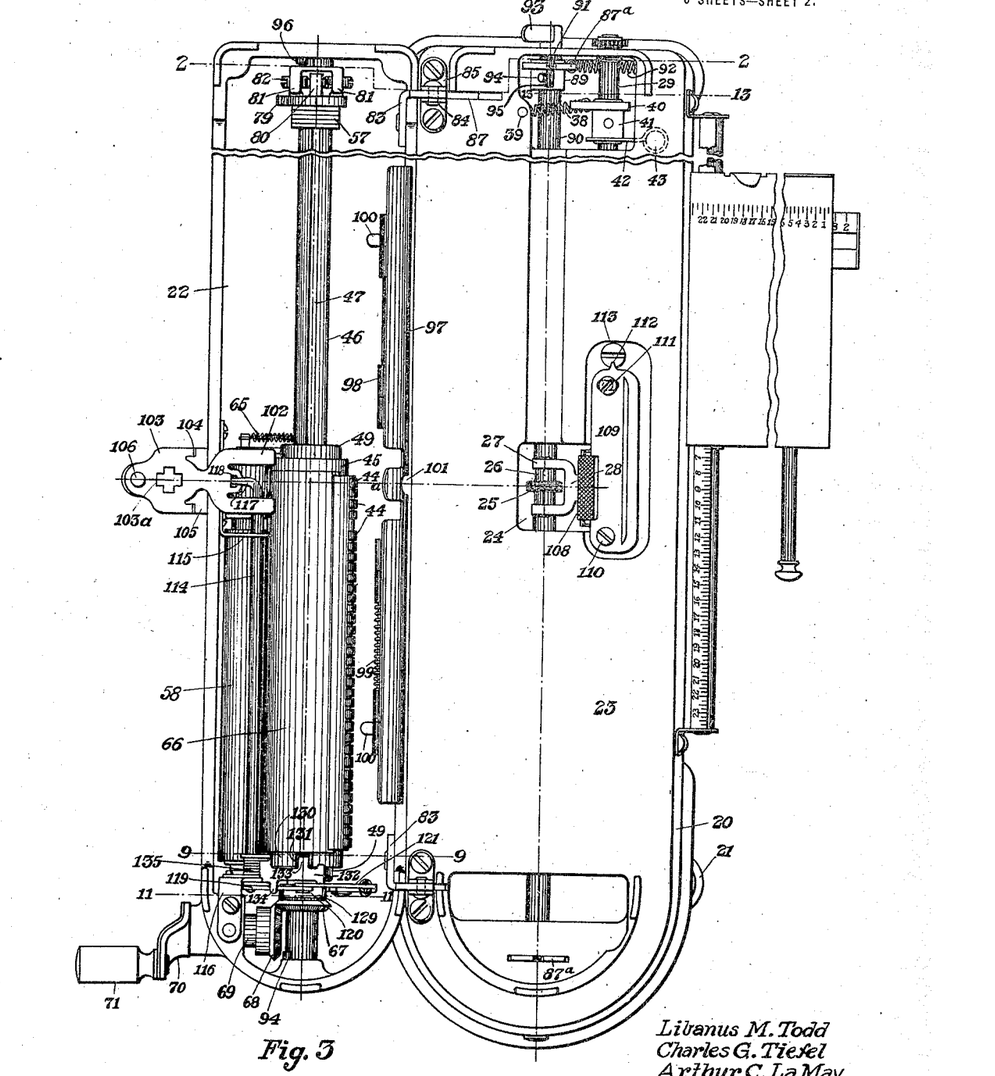
Fig. 3 is a plan view of the machine, partly broken away, also showing the casing in opened position.
Figure 6:
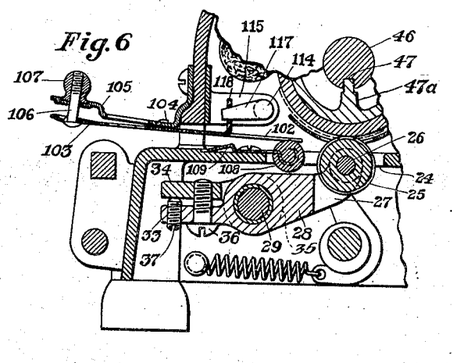
Fig. 6 is a fragmentary sectional elevation, enlarged, taken on line 6—6 of Fig. 1.

The printing bed 23 is provided with an opening 24, Figs. 3 and 6, through which is adapted to project a platen 25 in the form of a small wheel carried on a spindle 26 which is rotatably journaled at its ends in arms 27 of the platen yoke 28. This yoke is rotatably carried on a supporting shaft 29, Fig. 10, extending longitudinally of the machine and journaled in lugs 31 and 32 on the base portion of the casing, and also at its end 30, Figs. 1 and 13, in a sleeve 30ª which is threaded into the casing and serves as a means or device for longitudinal adjustment of the shaft 29. The sleeve 30ª is provided with a tooth flange with which is adapted to be engaged a locking pawl 30ᵇ for holding the sleeve after it has been adjusted in position.

Figure 10:
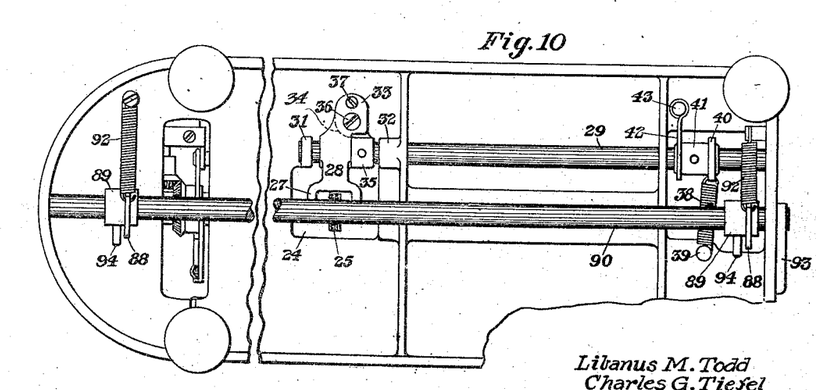
Fig. 10 is a bottom plan view of the machine partly broken away.

The platen yoke 28 is preferably provided with an arm 33, Figs. 6 and 10, and the shaft 29 with an angular arm 34 extending from a hub 35 pinned to the shaft, and these arms extend in parallel spaced relation and are provided with adjusting screws 36 and 37 by means of which the platen yoke 28 may be adjusted in position on the shaft 29 for regulating the distance through which it is projecting above the printing bed.

The platen is normally held in lower or inactive position with the top of the wheel level with or slightly below the printing bed 23, by means of a spring 38 attached at one end to a pin 39 on the printing bed, Fig. 3, and at its other end to an arm 40 extending upwardly from a sleeve 41 pinned to the shaft 29. The sleeve 41 carries also a horizontal arm 42 provided at its end with a stop member 43 adapted to contact with the lower side of the printing bed to limit the downward movement of the platen. The means for actuating the platen upwardly into contact with the type forms will be later described.

Printing characters are provided in the type forms 44, Fig. 3, extending circumferentially in parallel spaced relation on the periphery of a type carrier or cylinder 45 slidably carried on a shaft 46 journaled at its ends in the casing 22. The shaft is provided with a keyway 47 with which engages a key 47ª, Fig. 6, on the cylinder 45, so that while the cylinder may be freely slid longitudinally of the shaft it is fixed to rotate therewith, so that the shaft serves as a driving means for the cylinder.

Figure 7:
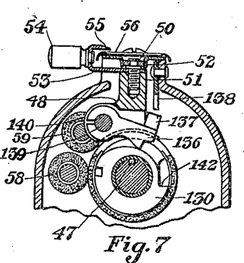
Fig. 7 is a fragmentary sectional elevation taken on line 7—7 of Fig. 8, showing the centering and locking device for the type carrier.

For shifting the type cylinder 45 longitudinally of the shaft 46 there is provided a yoke 48 having ends 49 which have a sliding bearing on the shaft 46 and embrace the ends of the cylinder 45, and the yoke is thus supported for sliding movement longitudinally of the shaft, but is prevented from rotating therewith by means of a small roller 50, Fig. 7, carried by an upwardly extending lug 51 on the yoke and engaging between parallel guideways 52 supported by the casing. The lug 51 serves also as a means of attachment for an angular plate 53, which, extending horizontally through an opening in the casing carries an operating handle 54, and also an index or pointer 55 extending in proximity to a dial or scale 56 carried on the top of the casing.

Figure 5:
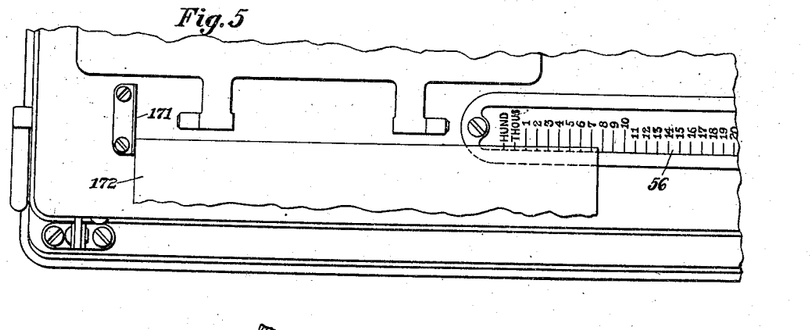
Fig. 5 is an enlarged plan of a portion of the top of the casing showing the check measuring device.

The dial 56 is provided with a series of numerals, Fig. 5, corresponding with the series of type forms on the cylinder 45, and it will now be understood that by grasping the handle 54 the cylinder may be slid longitudinally of the shaft to position the pointer 55 over a selected character on the dial 56, thus bringing the corresponding type form on the cylinder opposite the platen for coöperation therewith upon rotation of the cylinder.

The means for inking the type forms comprise a pair of inking rolls 58 and 59 coextensive with and parallel to the type cylinder 45. These rolls have the ends of their spindles journaled in bearings in a pair of plates 60, the ends 60ª of the spindle of the lower roll extending beyond the plates. The latter are provided with trunnions 60ᵇ, which, with the extended ends 60ª of the spindle rest upon inclined bearing surfaces 61 on plates 62, thus forming a two point support for the plates 60 and the inking rolls, and the plates serve to hold the rolls in spaced relation. Plates 62 are pivoted at 63 to the ends of the yoke 48 and retaining plates 64, pivoted at 65 to plates 62 and having hooked upper ends, are pressed by means of springs 65ª against the supporting trunnions of the ink rolls, thus holding the parts securely in contact and turning plates 62 about their pivots until the inking rolls contact with the type cylinder. The object of this construction is to afford a yielding support for the rolls and the retaining plates 64, being readily accessible through the opening in the casing, may be swung back to allow removal of the rolls through this opening, for cleaning or reinking.

The type cylinder 45 over the portion of its periphery opposite the type forms is provided with an ink spreading pad 66 which comes in contact with the inking rolls 58 and 59 at each rotation of the cylinder and serves to distribute the ink so that it will be applied evenly by the inking rolls to the type forms.

The shaft 46 is driven by means of a small beveled gear 67 thereon, with which meshes a similar gear 68 carried at the inner end of a stub shaft 69 journaled in the casing. The shaft 69 extending to the exterior of the casing carries the crank 70 having a handle 71 by means of which the type cylinder is rotated.

The crank 70 is detachably connected to the shaft 69 so that it may be readily removed as a means for preventing unauthorized operation of the machine, and also for convenience in shipment. The crank arm 70, Figs. 1 and 12, has a dovetailed slot 72 in its end, the inclined sides of which are adapted to engage in correspondingly inclined slots 73 cut into the adjacent end of the shaft 69 on opposite sides and transversely thereof, and the arm 70 carries a spring plate 74 fixed thereto at one end by a pin 75. The other end of the plate 74, however, is adapted to be sprung away from the arm 70 being guided for this purpose by a pin 76, and the plate 74 has in its movable end a circular opening 77 adapted to snugly fit the end of the shaft 69. The plate 74 is provided at its end with a finger piece 78 by means of which it may be sprung away from the plate 70. It will be understood from the above description, that the crank arm 70 may be inserted in the slots 73 of the shaft 69 affording a driving connection therewith, but the inclined bottoms of the slots 73, corresponding to the inclined sides of the slot in the crank arm, prevent the placing of the crank on the shaft 69 in any but its proper angular position. As the crank is slipped into place the spring plate 74 automatically snaps over the end of the shaft 69 and holds it in place until, by means of the finger piece 78, the spring plate is retracted to allow for removal of the handle.

Figures 1, 2, 12, 25, 26:
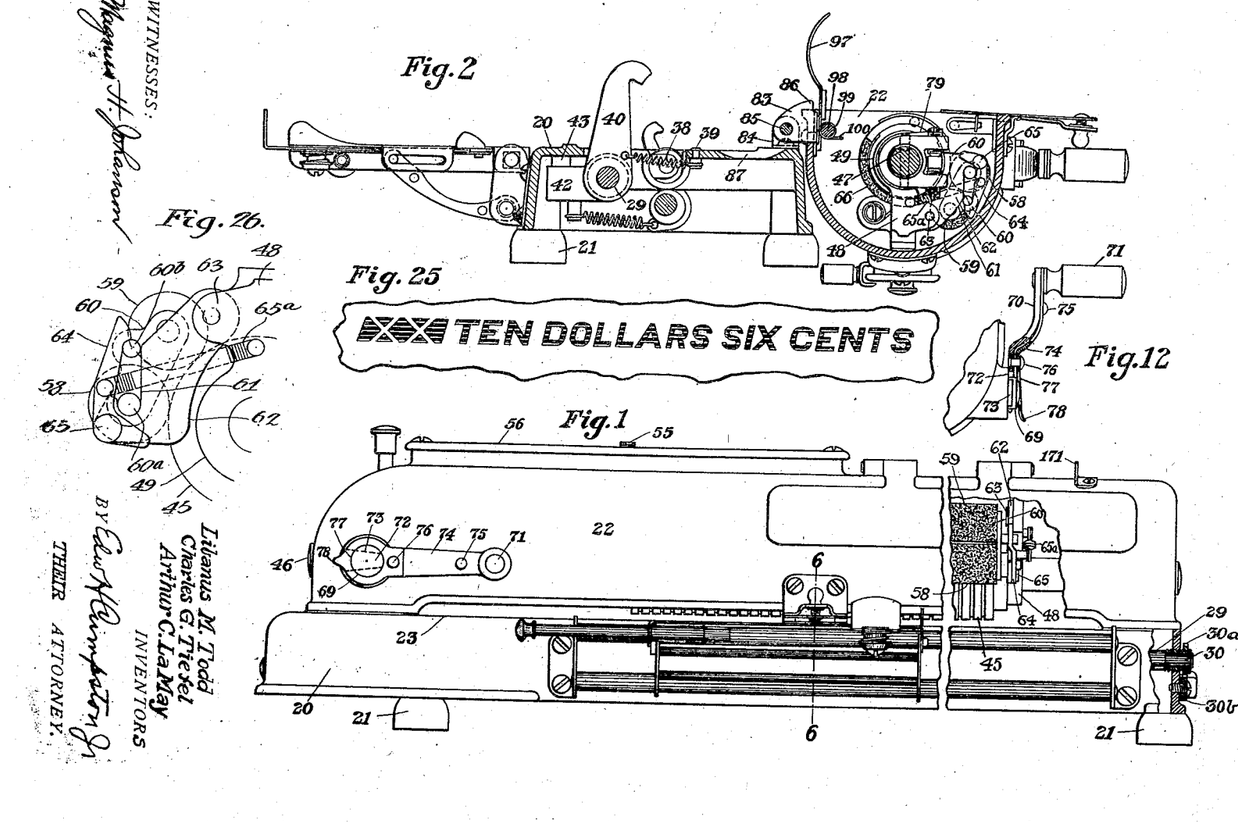
Figure 1 is an elevation of the right side of the machine partly broken away.
Fig. 2 is a sectional elevation taken on line 2—2 of Fig. 3, with the upper portion of the casing turned back to expose the interior parts.
Fig. 12 is a detail, partly in section, of the operating crank.
Fig. 25 is an enlarged view of a line of printing produced by the machine.
Fig. 26 is an enlarged detail end view of the supporting means for the inking rolls.
Figures 4, 13:
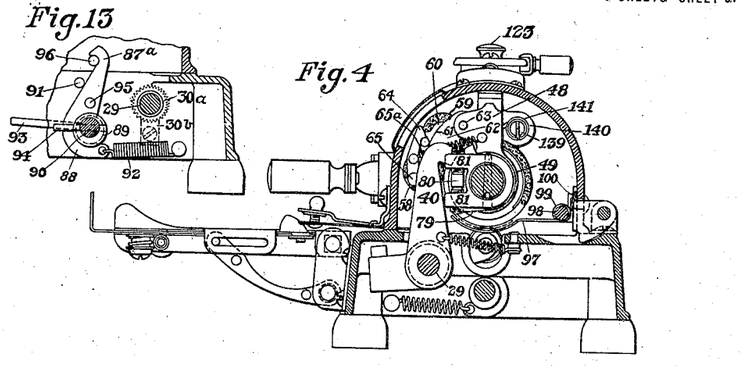
Fig. 4 is a view similar to Fig. 2, the casing being shown, however, in closed, or operating, position.
Fig. 13 is a fragmentary sectional elevation on the line 13—13 of Fig. 3.

The platen 25 is actuated upwardly to make printing contact with the proper type form as the latter rolls over the platen by means of a cam 79, Figs. 2, 3 and 4, on the shaft 46 which is adapted to actuate the arm 40 on the shaft 29 to rock the shaft. As the angular adjustment of the cam 79 on the shaft 46 is important, as will be presently described, a means is provided for adjusting the position of the cam comprising a lug 80 projecting from the surface of the cam between arms 81 fixed to the shaft 46 and carrying screws 82, by turning which the cam may be angularly adjusted about the shaft 46.

Figure 14:
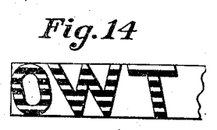
Fig. 14 is an enlarged view of the printing surface of several of the type characters.
Figure 15:
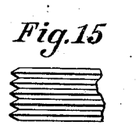
Fig. 15 is an enlarged fragmentary view of the printing surface of the platen.

In order to break or disrupt the paper during the printing impression, so that the ink will be thoroughly absorbed by the paper and thus prevent alteration of the impression, the printing surfaces of the type and platen are formed with serrations, the projecting portions or ridges of each surface being adapted to coöperate or mesh with the grooves of the other for the purpose of stretching or breaking the paper. One form of this construction is well illustrated in Fig. 14, where the type are shown as provided with serrations extending longitudinally thereof, and in Fig. 15, where the printing surface of the platen is shown as having serrations running circumferentially thereof, but it is to be understood that the serrations may extend in any direction.

Figure 16:
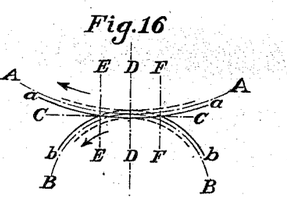
Fig. 16 is a diagrammatical view illustrating the action of the printing surfaces of the type and platen.
Figure 17:
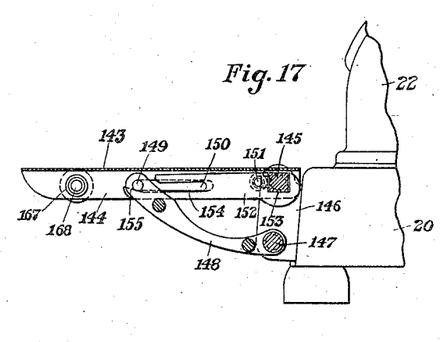
Fig. 17 is a sectional elevation of the work supporting table taken on line 17—17 of Fig. 20, showing the table in working position.
Figure 18:
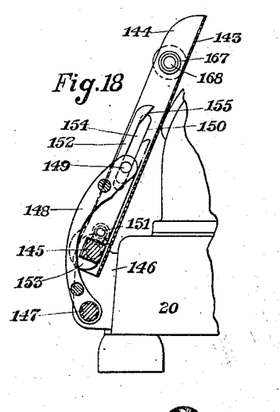
Fig. 18 is a similar view showing the table in folded position.

Fig. 16 illustrates the method of coöperation of the printing surfaces of the type forms and the platen. As the type form rolls longitudinally in contact with the platen it will be seen that the paper between these surfaces will receive the impression of the inked type characters, being disrupted by the coöperating serrations, and will be simultaneously fed forward across the printing bed. The serrations of the printing surfaces serve not only to disrupt the fibers of the paper, but also to feed the paper a spacing distance between adjoining words. Thus, as the end of a given word reaches the line D D, Fig. 16, the printing impression is completed but the paper continues to be fed forward, due to the engagement therewith of the meshing serrations of the type form and platen which move the paper forward until the end of the type form reaches the line E E, or until the platen, before that time, is allowed to drop out of contact with the type cylinder. The time of retraction of the platen thus becomes a means for controlling the length of the spacing distance between words, which, in a machine of this nature is an important feature in the protective value of the impression. It is for this purpose that the device described above is provided for adjusting the angular position of the cam 79 for controlling the actuation of the platen. As the high portion of this cam rolls into contact with the arm 40 the platen is raised for contact with the type forms, and as this high portion moves out of contact with the arm, the platen is allowed to drop away from the type cylinder, thus terminating the feeding movement of the paper. It will be noted, by reference to Fig. 3, that the type forms all terminate with their rear ends in alinement axially of the type cylinder, so that by advancing or retarding the cam 79 the time at which the platen is retracted may be controlled for regulating the spacing feed imparted to the paper upon the completion of the impression of each word on the type carrier.

The parts 20 and 22 of the casing of the machine have a hinged connection permitting them to be swung apart from the operating position illustrated in Figs. 1 and 4, to the open position shown in Figs. 2 and 3, for affording access to the interior parts. This hinged connection comprises a member 83, Fig. 3, securely fixed to the upper portion of the casing and pivotally supported by means of a pin 84 between a pair of upwardly extending angle plates 85 securely attached to the lower portion of the casing. The member 83 is provided with a downwardly extending lug 86, Fig. 2, adapted, when the parts of the casing are brought together, to enter a kerf 87 in the lower portion of the casing, thus forming a kind of dowel which securely and accurately connects the parts of the casing when in operative position, which is essential to the proper coöperation of the serrated printing surfaces of the type and platen.

For the purpose of securely clamping the parts of the casing in closed or working position there is provided at each end of the lower portion of the casing a member 87$^a$, (Fig. 13) having a hooked upper end, and a curved lower end 88 embracing an eccentric sleeve 89 on a shaft 90 extending longitudinally and journaled in the ends of the casing, Fig. 10. The hooked upper end of the member 87$^a$ is adapted to engage over a pin 96 carried by the upper portion of the casing. The movement of the member 87$^a$ toward the left, as seen in Fig. 13, is limited by pin 91 in the lower portion of the casing, and the lower curved end of the member is held in contact with the eccentric sleeve by means of a spring 92 attached at its other end to the casing. As the shaft 90 is rocked by means of the handle 93 exterior of the casing, a pin 94 in said shaft engages a pin 95 carried by the hooked member and swings the latter toward the right so that its upper end is disengaged from the pin 96 to permit the opening of the casing. When the casing is closed and it is desired to lock the parts together, the handle 93 is turned downwardly and the hook member 87$^a$ is thus allowed to engage over the pin 96. Further downward movement of the handle 93 causes the eccentric surface 89 to draw the hook downwardly and thus securely clamps the parts of the casing together.

A guard plate 97, Figs. 2, 3 and 4, hinged at 98 to the upper portion of the casing extends across the bottom of the latter and over the type forms, for the purpose of preventing the latter from smearing the work with ink. A spring 99 is provided for urging the plate into closed position adjacent the type forms, and a pair of stops 100 are provided for contacting with the upper portion of the casing to limit the movement of the guard plate under the actuation of the spring. The guard plate is thus normally held in protective position over the type forms, but may be swung away from the casing when the latter is opened, to afford access to the interior of the upper portion of the casing. An opening 101 is provided in the guard, directly above the platen, of sufficient size to allow the latter to raise the paper therethrough into contact with the printing type form but preventing contact of the work with the adjacent inked forms.

The above described construction of the machine in which the type carrier and its associated parts are located in the upper half of the casing and the latter hingedly supported on the base of the casing, has, in addition to the functions pointed out, the additional advantage of affording means for viewing the work at any time during its progress through the machine without disturbing the position of the work. That is to say, should the operator of the machine be interrupted while printing a legend so that it is uncertain what word of the legend was last printed, or if for any reason it should be desired to inspect the work, the upper portion of the casing may be unlatched and swung back without deranging the position of the work and a full inspection of the latter thus afforded.

A paper guiding means is provided in the pair of spring fingers 102, Figs. 3 and 6, projecting above the printing bed from a plate 103, which is pivotally supported at 104 on a bracket 105 fixed to the exterior of the casing at the right side of the machine and opposite the platen. These fingers 102 are therefore in position to bear upon the paper as it passes into the machine on opposite sides of the line of printing. The pressure of the fingers against the paper may be regulated by a screw 106 engaging the plate 103 and threaded into a nut 107 on the upper side of the bracket 105 so that by turning the nut the spring fingers may be urged with more or less pressure against the printing bed. The pressure of the fingers upon the paper not only holds the paper against inadvertent movement on the printing bed but imparts a slight drag to the paper, and this drag, or retardation, may be invoked to control the amount of the spacing distance between words, in addition to the means previously explained for this purpose in connection with the description of the platen actuating means.

Coöperating with the pressure foot above described, there is provided a small knurled roll 108 journaled at its ends on a plate 109 carried by the printing bed. This plate has a close bearing about a screw 110 in the printing bed, but at its opposite end is provided with an elongated slot 111 embracing a screw in the printing bed so that the plate 109 and the roll 108 carried thereby may be turned slightly about the screw 110. The plate is provided with a projecting finger 112 engaging in a recess in the head of a screw 113, by turning which, the axis of roll 108 may be adjustably inclined with respect to the axis of the platen. By this means the direction of the feeding movement of the paper may be varied in order to maintain the edge of the paper against a guide on a work table to be described hereafter.

Figure 11:
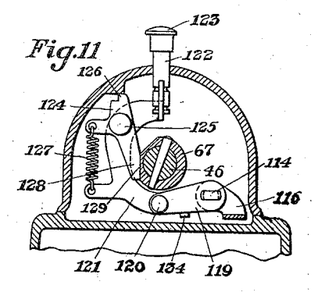
Fig. 11 is a sectional elevation taken on line 11—11 of Fig. 3, the casing being shown in closed position.

For raising the pressure foot to allow the insertion or withdrawal of the work there is provided a shaft 114, Figs. 3 and 6, journaled in brackets 115 and 116 in the upper portion of the casing and having a curved finger 117 at its end adapted to engage in an eye in an upwardly extending leaf 118 on the pressure foot plate 103. By means of the shaft the pressure foot may be raised out of contact with the roll 108 on the printing bed, and the shaft is rocked for this purpose by means of an arm 119, Figs. 3 and 11, extending horizontally above the printing bed and having pivoted to its end 120 a plate 121 which is curved about the shaft 46 and has pivoted to its upper end a plunger 122 extending through the top of the casing and provided with a finger piece 123. The tension of the pressure foot plate 103 tends to hold the plate 121 and plunger 122 in raised position, but by depressing the finger piece 123 it will be seen that the pressure foot may be raised clear of the printing bed. A means is provided for retaining the pressure foot in raised position and for automatically tripping the same at the beginning of the printing impression, comprising a member 124, Fig. 11, pivoted at 125 to the plate 121 and having an upper end 126 adapted to engage with a lug on the wall of the casing. The lower end 128 of the member 124 is adapted to contact with a cam surface on the shaft 46, which in this embodiment is on the hub of the gear 67. This cam surface is provided with a flat portion 129 which contacts with the lower end 128 of the member 124 when shaft 46 is in such position that the type forms are out of contact with the platen. A spring 127 is provided between the plate 121 and member 124 for the purpose of urging the upper end of the latter toward the lug on the casing and its lower end 128 into contact with the cam. Thus, when the finger piece 123 is depressed while the type forms 44 are out of contact with the platen, the upper end 126 of member 124 engages under the lug on the casing and retains plate 121 in lowered position and the pressure foot in raised position so that the paper may be inserted in the machine, but when shaft 46 is rotated, previous to contact between the type forms and platen, the flat portion 129 on the hub of gear 67 passes out of contact with the member 124, the upper end 126 of which is therefore moved out of engagement with the lug on the casing, and the pressure foot is automatically tripped for engagement with the paper.

Figure 9:
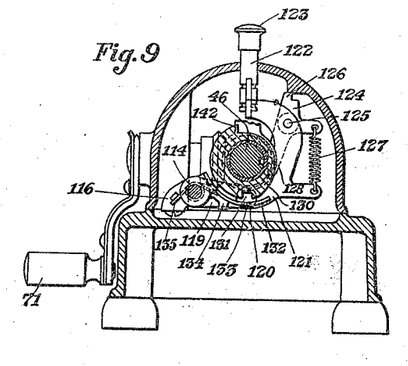
Fig. 9 is a sectional elevation taken on line 9—9 of Fig. 3, the casing however being in closed position.

It has been found in practice that unskilled operators are apt to use the conventional initial limiting character, shown in Fig. 25 and located at 44$^a$, at the end of the type carrier, Fig. 3, excessively, as, for instance, in filling in whole blank lines, and this excessive use tends to prematurely wear out this character. A device has therefore been provided for preventing repetition in the use of this character in the printing of an amount, comprising a cam 130, Figs. 3 and 9, on the end of the type cylinder, having a recess 131 in the periphery thereof, and a plate 132 having a lug 133 adapted to engage the recess 131. The plate 132 is pivotally supported on shaft 114 and carries a lug 134 adapted to engage the lower edge of the arm 119 on the shaft 114 under the actuation of a spring 135. When the finger piece 123 is depressed for the purpose of inserting the paper to be printed, the plate 132 will be pushed downwardly so that its lug 133 will not engage in the recess 131, and the cylinder may be rotated to produce an impression from the character 44ᵃ (see Fig. 9). As previously explained, however, the finger piece 123 is released as the type character moves into contact with the platen so that if it is attempted to rotate the type cylinder a second time the lug 133 engaging in recess 131 will lock the type cylinder against rotation. When the cylinder is moved longitudinally, however, to select any other printing character, the cam 130 is moved out from under the lug 133 and the cylinder may therefore be rotated to make as many impressions as desired, but may not be moved to bring the character 44ᵃ to the printing point again because of the contact of the end of cam 130 against the end of lug 133. When the finger piece 123, however, is depressed to insert a new piece of paper, the lug 133, as previously explained, is moved out of operative position and an impression may be made from the type character 44ᵃ.

Figure 8:
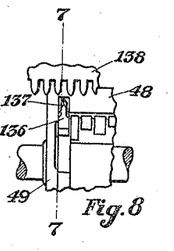
Fig. 8 is a fragmentary side elevation of the same.

For accurately centering and locking the type forms in printing position there is provided on the cylinder yoke a dog 136, Figs. 7 and 8, having a beveled projection 137 adapted to be moved upwardly into engagement with the teeth of a rack bar 138, fixed on the casing, by means of the cam 130. The dog 136 is fixed on a stub shaft 139 journaled in a lug 140 on the yoke 48, and the spring 141, Fig. 4, is provided for holding the dog normally downward in contact with the surface of cam 130 which is provided with a low portion and a high portion, as illustrated in Fig. 7, where the dog is shown in lowered position, the parts being in the relation that exists when the crank is in starting position and the type cylinder is free for adjustment for selection of the type forms. As the crank is rotated to make an impression, the high portion of cam 130 raises dog 136 and its beveled projection 137, engaging the beveled teeth of rack bar 138, moves the selected type form accurately into position and securely locks it as the dog 136 seats fully between the teeth of the rack bar. When the type have moved out of contact with the work the depressed portion 142 of the cam allows the dog to drop out of contact with the rack under actuation of spring 141 as the handle is returned to starting position.

Figure 19:
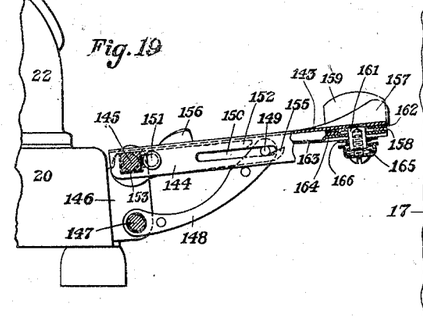
Fig. 19 is a sectional view of one end of the table, partly broken away, and showing the table slightly raised to release the clamping means.
Figure 20:
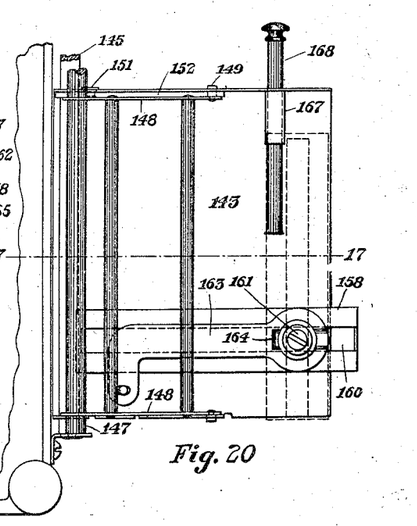
Fig. 20 is a bottom plan view of the table.

For supporting and guiding the paper during the printing operation there is provided a table 143, Figs. 17 to 21, inclusive, having downwardly extending flanges 144 slidably engaging a bar 145 supported at its ends in a bracket 146 on the lower base portion 20 of the casing. The bracket 146 supports also a rod 147 upon which are pivoted and longitudinally slidable a pair of curved supporting arms 148 each carrying at its upper end a pin 149 adapted to engage in a slot 150 in the flange 144 of the table, so that the table may be swung up and back against the upper portion 22 of the casing about the bar 145 as a pivot, the pin 149 sliding in the slot 150. At one side of the table the flange 144 has pivoted thereto at 151 a bar 152 having at its rear end a jaw 153 adapted, as the outer end of bar 152 is moved downwardly about its pivot, to frictionally clamp the bar 145. Bar 152 is provided at its outer end with an open slot 154, the lower side of which is provided with a cam surface 155 which is adapted to be engaged by the pin 149 as the latter moves into the outer end of slot 150 when the table is lowered into horizontal or working position. This cam surface serves to turn bar 152 about its pivot and force it into clamping engagement with the bar 145 so that the table is locked against movement longitudinally of the machine. When the table is slightly raised, however, as illustrated in Fig. 19, pin 149 moves out of contact with the cam surface 155 and the table is released so that it may be slid along its guides for the proper positioning of the work. The table is provided at one end with guide flanges 156 and 157, and also, at its forward side with a sliding gage bar 158 having an angular flange 159 projecting above the table. This gage has a slot 160 extending longitudinally thereof and embracing a post 161 projecting downwardly from the bottom of the table, and a washer 162 is interposed about the post between bar 158 and the table. Loosely attached to the bottom of the table is a plate 163 provided with an indented portion 164 adapted to engage within the slot 160 of the bar 158, and the plate 163 is pressed against bar 158 by means of a spring 165 interposed between a washer 166 and a cap secured to the outer end of the post. By means of this construction gage bar 158 is guided for movement in extension of the table by the indented portion 164, but by the exertion of a slight pressure bar 158 may be turned to force the indented portion 164 out of engagement of slot 160 so that the gage bar may be folded in alinement with the front side of the table and with its flange 159 out of the way. The table carries at one side a socket 167 in which a rod 168 is slidably supported so that it may be drawn out as an extension of the table for supporting a wide piece of paper, as, for instance, a voucher.

Figure 21:
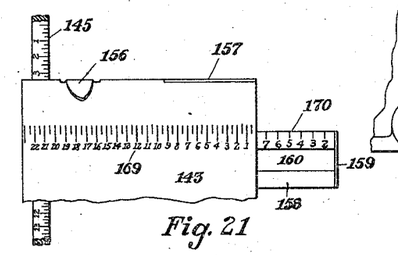
Fig. 21 is a fragmentary view of the table showing the several scales for the adjustment of the table and work.
Figure 22:
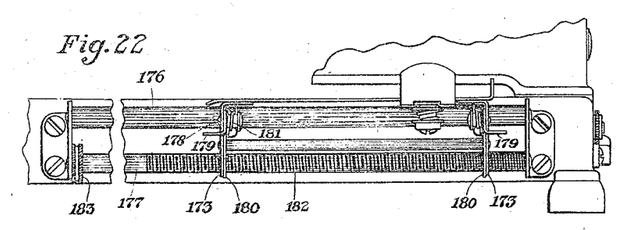
Fig. 22 is a side elevation of a modified form of table.
Figure 23:
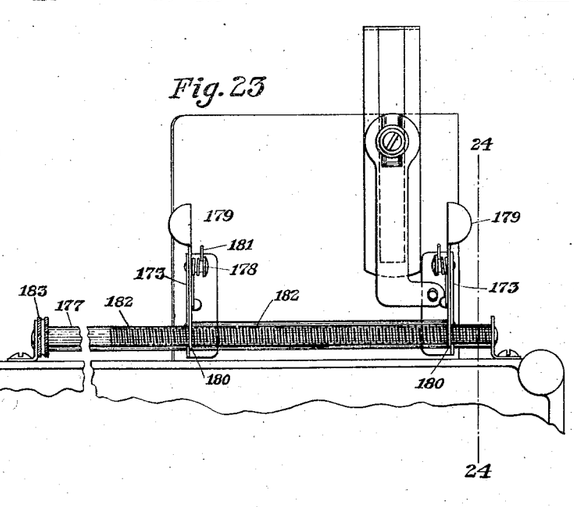
Fig. 23 is a bottom plan view of the same.
Figure 24:
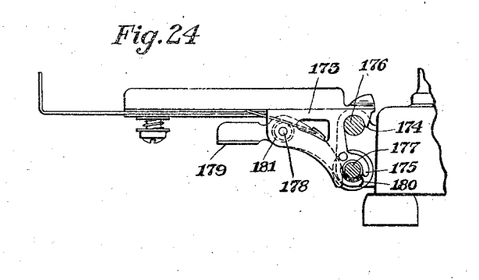
Fig. 24 is a sectional end elevation taken on the line 24—24 of Fig. 23.

Bar 145 is provided with a scale or dial, Fig. 21, to aid in placing the table in proper position for a given size of work, and the upper surfaces of the table and gage bar are provide with scales or dials 169 and 170, respectively, to aid in locating the work with relation to the printing couple. A check having been placed upon the table with its upper edge resting against the guides 156 and 157 the table is slightly raised and adjusted longitudinally of its guides to some desired position previously noted on the scale of the guide bar 145, or else until the printing line appears under the sight opening 103ª in the leaf 103 previously described. The check is then moved inwardly until the point at which the impression is to commence is brought between the printing couple. The latter adjustment is made in connection with scale 169, or with the flange 159 of gage bar 158, and a means has been devised for indicating the proper position of the gage bar comprising an angular flange 171, Fig. 5, upon the top of the casing. The check 172 is placed with one end against the flange 171 and its other end adjacent the dial 56. The numeral on the dial opposite the end of the check is noted, and the gage bar 158 is then adjusted to place the corresponding numeral of scale 170 at the forward edge of the table, as shown in Fig. 21. If the outer end of the check is then placed against the flange 159 the inner end of the check will be in proper position between the printing couple. A modified construction of work table is illustrated in Figs. 22, 23 and 24. This table is similar to the one previously described, except as to the means for supporting it on the casing. The table has at each side a bracket 173 provided with hooks 174 and 175 adapted to engage over upper and lower guide rods 176 and 177 secured to the base portion of the casing. Pivoted to each bracket at 178 is a manual clamping piece 179 having a lower hooked end 180 adapted to clamp the lower rod 177 under the actuation of a spring 181. By pressing upon the clamping piece 179 the table is released and may be removed by an upward motion from its guide rods. The lower rod 177 is provided with a screw thread 182, and the upper edge of end 180 of piece 179 is beveled to engage in these threads. Rod 177 is provided at one end with a knurled head 183 so that it may be rotated. This table may be adjusted longitudinally on its guides by retracting the clamping piece, and the threaded rod 177 provides a more precise means for final adjustment.

The operation of the machine has already been suggested in connection with the description of the construction and will be understood from a brief explanation. Finger piece 123 having been depressed and the check properly located in position between the members of the printing couple, the type cylinder is shifted by means of handle 54 to bring the conventional initial character to the printing point. The type cylinder is then rotated by means of handle 71, which automatically releases the pressure foot and then simultaneously prints and feeds the paper. The desired characters are then selected in order, and after each selection the crank is rotated to print the corresponding character. If, for instance, the amount desired to be printed is $127.56—the pointer 55 is successively positioned opposite the characters "1", "Hundred", "20", "7" "Dollars", "50", "6", "Cents". The impression having been completed, the finger piece 123 is depressed to allow the removal of the printed check and the insertion of a new one.

Having thus described our invention, what we claim as new, and desire to secure by Letters Patent is:—

1. In a check writer, the combination with a printing couple, of a two part casing therefor, each part supporting one member of said couple, a connection between the parts of the casing by means of which one of the parts may be swung away from the other to afford access to said parts and to the work, and manually operatable means for securing the parts of the casing together.

2. In a printing apparatus, a supporting frame including a base portion and an upper portion supported on the base portion and separated therefrom through a part of its extent to form a work receiving space between said casing portions; a type carrier supported in the upper casing portion; a platen supported by the base portion of the casing; a pivotal connection between said casing portions by means of which the carrier and platen may be swung apart for access thereto and to the work; and securing means for fastening said casing portions together.

3. In a printing apparatus, a supporting frame including a base portion and an upper portion supported on said base portion and spaced therefrom to form a work receiving opening therebetween; printing mechanism supported by said upper casing portion including a shaft supported therein, a type carrier on said shaft, inking means for the type and manipulative means for said carrier; a platen supported on said base portion of the casing; a pivotal connection between said casing portions by means of which the printing mechanism and platen may be swung apart for access thereto and to the work; and a manually operable latch for securing said casing portions together.

4. In a check writer, the combination with a lower frame having a bed plate for guiding the work, and a platen supported adjacent said bed plate, of an upper frame supporting a type carrier adapted to coöperate with the platen, a guard for the work across the bottom of the upper frame, said guard having an opening therein for permitting printing contact between the platen and type, a pivotal connection between the said frames by means of which the upper frame may be swung away from the lower frame to afford access to the carrier and platen and to the work, and a pivotal connection between the upper frame and said guard by means of which the latter may be swung away from said upper frame, for affording access to the interior of the machine.

5. In a printing apparatus, a carrier provided with a type form and having a printing movement; a rotary platen and means for moving the latter toward and from the carrier for rolling contact with said type form during the printing movement of the carrier to print and feed the work, said type form and platen having coöperating means for advancing the work a spacing distance additional to the length of the printed impression; and mechanism for effecting said movement of the platen in timed relation to the movement of the carrier including a shaft, a cam mounted loosely thereon, and means for adjustably securing the cam to the shaft for varying the time of engagement of the type form and platen for controlling said spacing distance.

6. In a check writer, the combination with a shaft, a type cylinder driven thereby and carrying a type form, a platen adapted to be moved toward and from the cylinder for rolling contact with the type form, and a cam on said shaft for actuating the platen in timed relation to the rotation of the cylinder, of means for adjusting said cam comprising a lug on the latter, arms fixed on said shaft, and opposing screws in said arms bearing against said lug for shifting the cam relatively to said shaft and varying the period of contact between said type form and platen.

7. In a check writer, the combination with a bed, and a printing couple adapted to impress a check placed therebetween and feed it across the bed, of means for holding and guiding the check on the bed, comprising a supporting plate fixed above the bed, a resilient pressure plate pivoted near its center to the supporting plate and having one end extending into proximity with the bed in front of the printing couple and its other end extending outwardly beneath the end of the supporting plate and at an angle relatively thereto, and means for adjustably drawing the outer end of the pressure plate toward the supporting plate to press the inner end thereof into resilient bearing upon the bed.

8. In a check writer, the combination with a bed having a guide for the check, a rotary printing cylinder having a type form thereon, and a platen adapted for rolling contact with said type form to impress and feed a check placed therebetween, said type form and platen having coöperating means for advancing the check a spacing distance at the end of each impression, of a roller journaled in said bed, means for adjustably inclining its axis relatively to said guide, a pressure foot holding the check against said roller, and means for adjusting the pressure between said foot and roller, for guiding the check in its passage through the machine and controlling said spacing distance.

9. In a check writer, the combination with a bed having a guide for the check, a rotary type cylinder having a type form thereon, a platen adapted for rolling contact with said type form to impress and feed a check placed therebetween, of a roller journaled in said bed, a pressure foot bearing upon the check to hold it in contact with the roller, and means for adjustably inclining the axis of the roller relatively to the guide for maintaining the check in contact with the guide during its passage through the machine.

10. In a check writer, the combination with a bed, a guide thereon, and means for feeding a check over the bed, of a roller journaled in a plate pivoted at one end to the bed and guided for movement thereon, means for pressing a check against said roller, a lug on the other end of said plate, a screw in said bed having a recessed head, said lug engaging in said recess, whereby the turning of said screw turns said plate about its pivot and inclines the axis of the roller to said guide for maintaining the check in contact with the guide during the feeding movement.

11. In a check writer, the combination with a printing couple, and a bed therefor, of a work table slidable along the bed and having a working position and a folded position, and automatic means for clamping the table against movement along the bed when placed in working position, and for unclamping the table when the latter is slightly raised, to permit the table to be adjusted along the printing bed.

12. In a check writer, the combination with a printing couple and a printing bed therefor, of guide means, a table slidable on the guide means along the printing bed, and movable into operative position, and also into folded position, and automatic means for clamping the table against movement relatively to the bed when in operative position, and for unclamping the table when the latter is slightly raised, to permit it to be adjusted along the printing bed.

13. In a check writer, the combination with a printing couple and a bed therefor, of guide rods, a table pivotally supported thereby and slidable thereon for adjustment along the printing bed, means for supporting the table in working position adapted to permit the latter to be folded into out of the way position, and means for automatically clamping the table against movement along the printing bed when the table rests on said supporting means and for automatically releasing the table when the latter is raised, whereby the table may be raised and freely adjusted along the bed and then lowered into clamped position.

14. In a check writer, the combination with a printing couple and a support therefor, of a table slidable along said support and adjustable with respect thereto to permit it to be moved into working position, or into folded position, and devices connected with the table and with said support adapted to automatically clamp the table against movement along the support when the table is in working position, and to automatically unclamp the table when the latter is slightly raised, for permitting it to be adjusted along the printing bed.

15. In a check writer, the combination with a printing couple and a support therefor, of a table slidable along the support and adjustable with respect thereto to permit it to be moved into working position, or into folded position, a device on the table adapted to engage said support, and a coöperating member connected with the support and adapted to actuate said device automatically for moving it into engagement with the support to clamp the table thereto when the latter is lowered into working position and for moving it out of engagement with the support for releasing the table when raised from working position to permit adjustment thereof along the support.

16. In a check writer, the combination with a printing couple and a support therefor, of a table pivoted to and slidable along the support, an arm having a pivoted and sliding connection with said support and slidably engaging the table to permit the latter to be lowered into working position or raised into folded position, a device on the table movable to engage said support and adapted to be automatically actuated by said arm for clamping the table to the support when the table is in working position and for releasing the table when raised from working position to permit its adjustment along the support.

17. In a check writer, the combination with a printing couple and a support therefor, of a pair of guide rods thereon and spaced therefrom, a table supported on the upper rod to turn about its axis and slide longitudinally thereof, an arm pivoted on the lower rod and slidable longitudinally thereof, said arm having a sliding connection with the table for supporting the latter in working position but allowing it to be folded up against the machine, and means on the table actuated automatically by said arm for gripping said upper rod when the table is in working position, and for releasing the rod when said table is raised, whereby the table may be slightly raised and freely adjusted along the bed and then lowered and clamped in position.

18. In a check writer, the combination with a relatively fixed platen, a shaft, a type carrier having a plurality of type forms thereon spaced longitudinally thereof, said carrier having a printing movement, and also a shifting movement longitudinally of the shaft to bring the type forms individually into coöperation with the platen, a member for shifting said carrier, a support having a plurality of recesses therein spaced in a direction longitudinal of the carrier to correspond with the spacing of the type forms, a pivoted locking dog on said shifting member and means for moving the dog into engagement with one of said recesses for centering and locking the type forms in printing position.

19. In a check writer, the combination with a casing, a platen, a type carrier provided with a plurality of individual type forms, said platen and carrier having a relative shifting movement for bringing the individual type forms and the platen, selectively, into coöperative relation and having also a relative printing movement to impress the work, of means for automatically preventing the repeated impression of a given type form.

20. In a check writer, the combination with a casing, a platen, a type carrier provided with a plurality of individual type forms and having a shifting movement for bringing the individual type forms, selectively, in coöperative relation with the platen, said platen and type carrier having a relative printing movement for impressing the work, of means on said carrier and coacting means on said casing for preventing the repeated impression of a given type form.

21. In a check writer, the combination with a casing having a bed, a platen, a type carrier provided with a plurality of type forms, said platen and carrier having a relative shifting movement for bringing the individual type forms and the platen, selectively, into coöperative relation and having also a relative printing movement to impress the work, of a pressure foot for holding the work on the bed, means for retracting the pressure foot to allow the insertion of the work, means for automatically releasing the said foot at the beginning of the printing operation, and means on said carrier and coacting means connected with said pressure foot for locking a given type form against repeated impression until released by the retraction of said pressure foot.

22. In a printing apparatus, a casing; a carrier therein provided with type, said carrier having a shifting movement to bring said type selectively to printing position and having also a printing movement; a rotary platen adapted for rolling coaction with a selected type, each of said type and the platen having means adapted to coöperate in registration with each other to print and feed the work; supporting means for said platen; and an adjusting device coöperating with said platen supporting means and with said casing and adapted to adjust the platen axially to maintain said coöperating means of the type and platen in register.

23. In a machine of the class described, a casing; a type carrier mounted therein, said carrier having a shifting movement to select the type and a rotary movement to print from the selected type; a rotary platen coöperating with the selected type during the printing movement of the carrier; the type and platen having mating ridges and grooves to shred, print and feed the work; and an adjusting device for adjusting the platen axially relative to the casing to secure and maintain mating relation of said ridges and grooves.

24. In a printing apparatus, the combination with a casing; a carrier therein provided with a type form; and a platen coöperating with the type form to impress the work; of indicating devices including a scale for indicating the size of the work, and a second scale upon which said size indication may be read to indicate the proper location of the work in the machine.

25. In a printing apparatus, a type carrier settable to bring various type forms selectively to printing position; a platen for coaction with a selected type form; a dial and index for setting said carrier, said dial and index being adapted to serve as a means for measuring the work; and a second dial upon which a work measurement may be read to indicate the proper location of the work in the machine.

LIBANUS M. TODD.
CHARLES G. TIEFEL.
ARTHUR C. LA MAY.